US012233755B2

(12) United States Patent
Abe et al.

(10) Patent No.: US 12,233,755 B2
(45) Date of Patent: Feb. 25, 2025

(54) VEHICLE SEAT

(71) Applicant: TS TECH CO., LTD., Asaka (JP)

(72) Inventors: Yasutaka Abe, Tochigi (JP); Yuta Sugaya, Tochigi (JP)

(73) Assignee: TS TECH CO., LTD., Asaka (JP)

(*) Notice: Subject to any disclaimer, the term of this patent is extended or adjusted under 35 U.S.C. 154(b) by 0 days.

(21) Appl. No.: 18/531,236

(22) Filed: Dec. 6, 2023

(65) Prior Publication Data

US 2024/0100998 A1 Mar. 28, 2024

Related U.S. Application Data

(63) Continuation of application No. 18/073,194, filed on Dec. 1, 2022, now Pat. No. 11,872,911, which is a
(Continued)

(30) Foreign Application Priority Data

Aug. 3, 2016 (JP) .................................. 2016-153141

(51) Int. Cl.
*B60N 2/06* (2006.01)
*B60N 2/07* (2006.01)
(Continued)

(52) U.S. Cl.
CPC ................ *B60N 2/065* (2013.01); *B60N 2/06* (2013.01); *B60N 2/0705* (2013.01); *B60N 2/20* (2013.01); *B60N 2/30* (2013.01); *B60N 2/12* (2013.01)

(58) Field of Classification Search
CPC ...... B60N 2/30; B60N 2/3038; B60N 2/3063; B60N 2/20; B60N 2/04; B60N 2/06; B60N 2/12; B60N 2/065; B60N 2/0705
See application file for complete search history.

(56) References Cited

U.S. PATENT DOCUMENTS 6,648,393 B1  11/2003  Milnar et al.
7,048,330 B2   5/2006  Daniel
(Continued)

FOREIGN PATENT DOCUMENTS

CN   103313875 A    9/2013
JP   S63137038      9/1988
(Continued)

OTHER PUBLICATIONS

Chinese Office Action for CN2017800493477 dated Oct. 9, 2020, 13 pages.
(Continued)

*Primary Examiner* — Gregory A Blankenship
(74) *Attorney, Agent, or Firm* — Dority & Manning, P.A.

(57) ABSTRACT

A vehicle seat is capable of taking a stowed position in which a seat back is folded onto a seat cushion and the seat cushion together with the folded seat back is rotatably lifted away from a floor, and the vehicle seat is configured to include a support member coupled to the floor; a rotating member rotatably supported by the support member via a support shaft extending in a right-left direction; a lower rail extending in a front-rear direction and coupled at an end to the rotating member so as to be extend literally offset relative to the support shaft; an upper rail slidably supported by the lower rail and coupled to the seat cushion; a coupling device provided at a second end of the lower rail on a side toward the support shaft and capable of selectably connecting to the floor; and an urging device extending the front-rear direction and having one end coupled to the support member and a second end coupled to the lower rail on the side toward the support shaft side, wherein the urging device is configured to be expandable and contractible in a longitudinal direction thereof so as to urge the seat cushion in
(Continued)

such a direction as to rotate about the support shaft away from the floor.

20 Claims, 10 Drawing Sheets

Related U.S. Application Data continuation of application No. 17/171,012, filed on Feb. 9, 2021, now Pat. No. 11,529,891, which is a continuation of application No. 16/321,156, filed as application No. PCT/JP2017/013554 on Mar. 31, 2017, now Pat. No. 10,946,773.

(51) Int. Cl.
*B60N 2/12* (2006.01)
*B60N 2/20* (2006.01)
*B60N 2/30* (2006.01)

(56) References Cited

U.S. PATENT DOCUMENTS

| | | | |
|---|---|---|---|
| 7,121,609 | B2 | 10/2006 | Tame |
| 7,325,850 | B2 | 2/2008 | Tame |
| 7,484,785 | B2 | 2/2009 | Weber |
| 7,748,766 | B2 | 7/2010 | Villeminey |
| 8,579,351 | B2 | 11/2013 | Takakura et al. |
| 8,590,970 | B2 | 11/2013 | Takaura |
| 8,864,209 | B2 | 10/2014 | White et al. |
| 10,946,773 | B2 * | 3/2021 | Abe .................. B60N 2/305 |
| 11,529,891 | B2 * | 12/2022 | Abe .................. B60N 2/30 |
| 11,872,911 | B2 * | 1/2024 | Abe .................. B60N 2/0272 |
| 2005/0230996 | A1 | 10/2005 | Toyota |
| 2006/0220411 | A1 | 10/2006 | Pathak et al. |
| 2009/0322115 | A1 | 12/2009 | Yamada |
| 2013/0300145 | A1 | 11/2013 | Otake et al. |
| 2018/0244179 | A1 | 8/2018 | Sasaki et al. |
| 2022/0227264 | A1 | 7/2022 | Mochizuki |

FOREIGN PATENT DOCUMENTS

| | | |
|---|---|---|
| JP | H0563968 | 8/1993 |
| JP | H10250433 | 9/1998 |
| JP | H10297327 | 11/1998 |
| JP | 2008260325 | 10/2008 |
| JP | 2012144203 | 8/2012 |
| JP | 2014166819 | 9/2014 |
| JP | 2015127201 | 7/2015 |
| WO | WO2005012030 | 2/2005 |

OTHER PUBLICATIONS

International Search Report for PCT/JP2017/013554 dated May 16, 2017, 4 pages.
Supplementary European Search Report for EP17836553 dated Apr. 7, 2020, 10 pages.

* cited by examiner

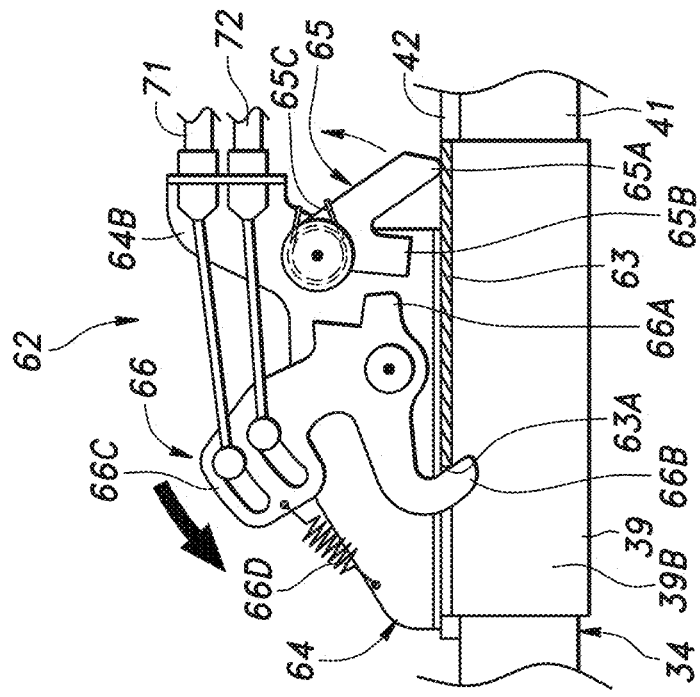
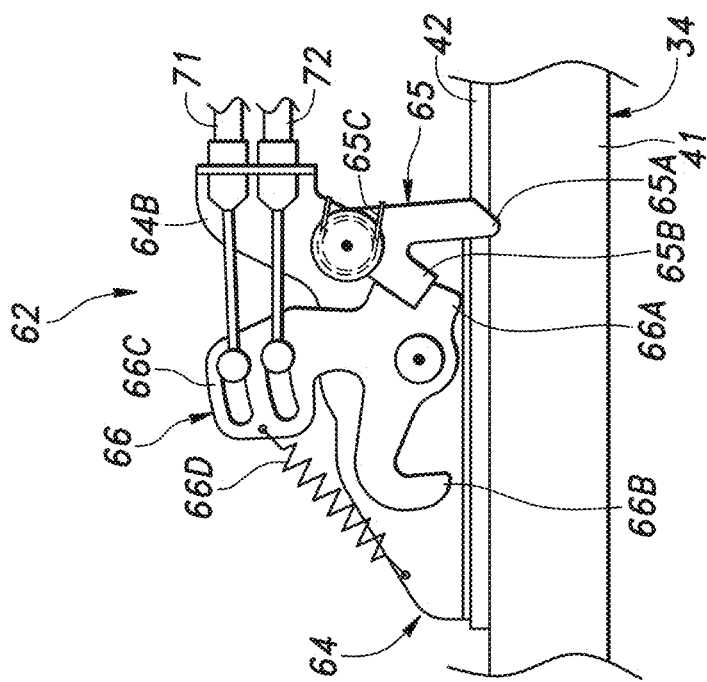

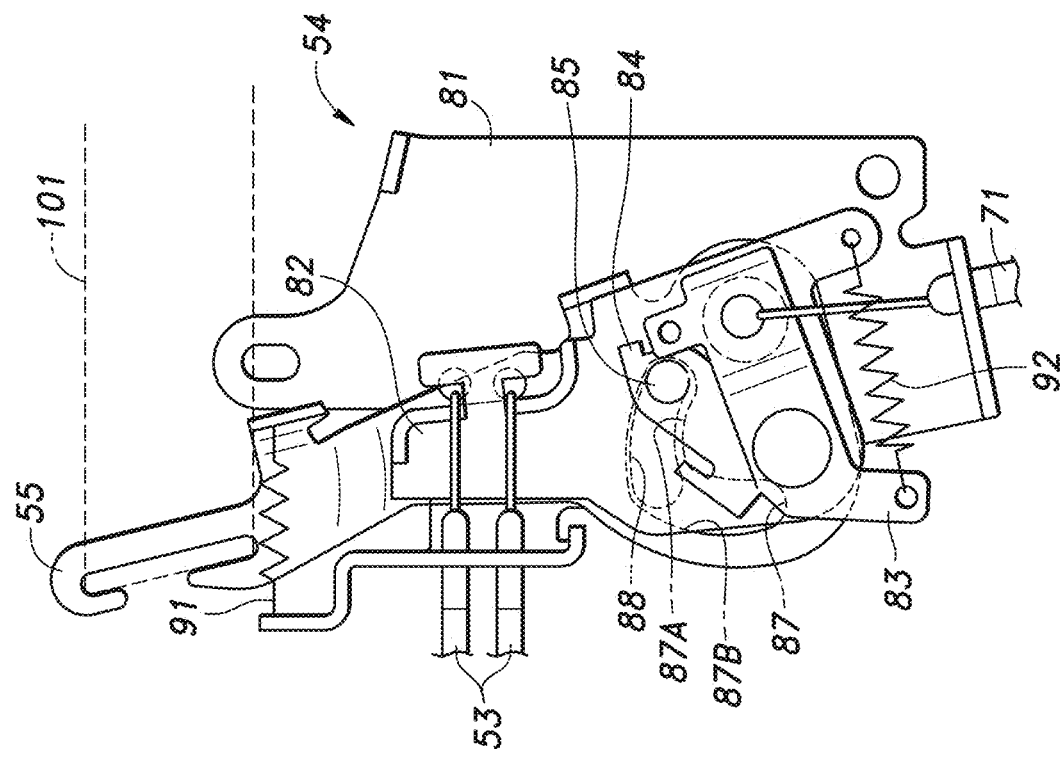
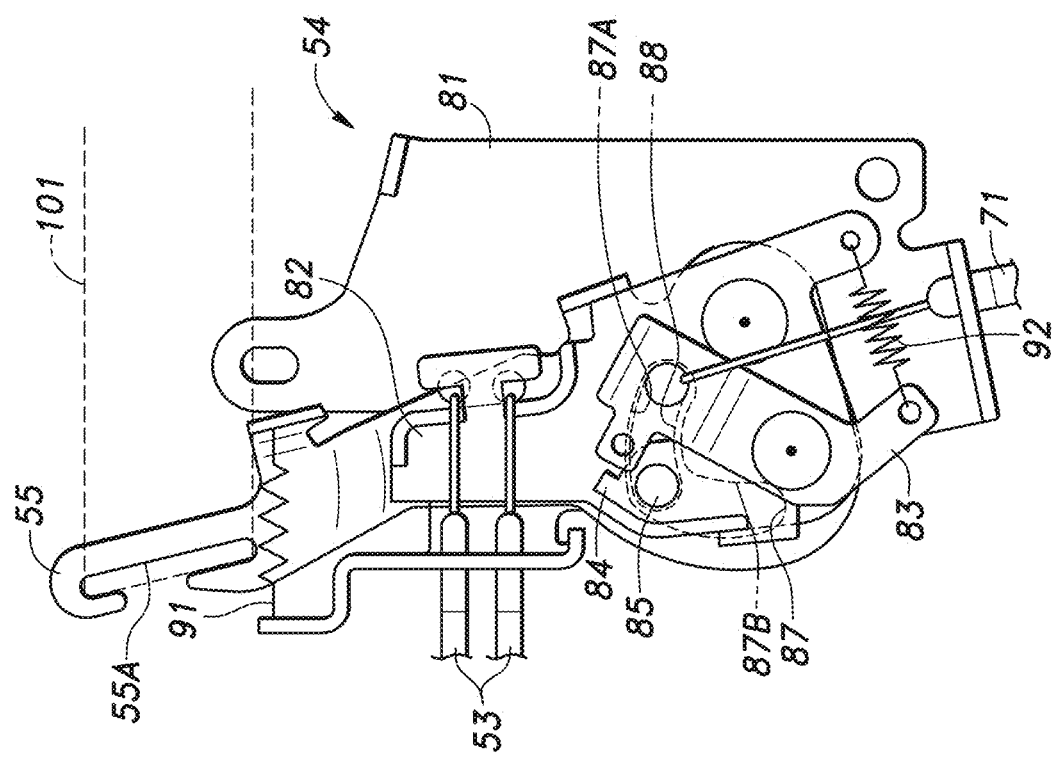

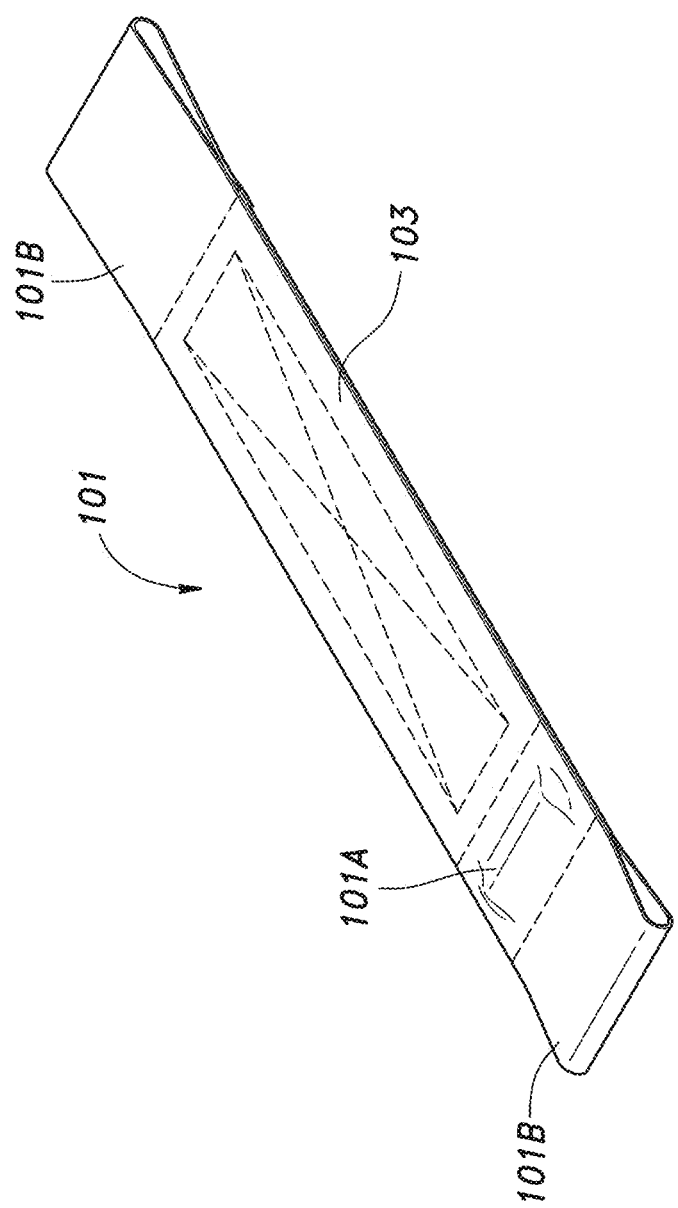
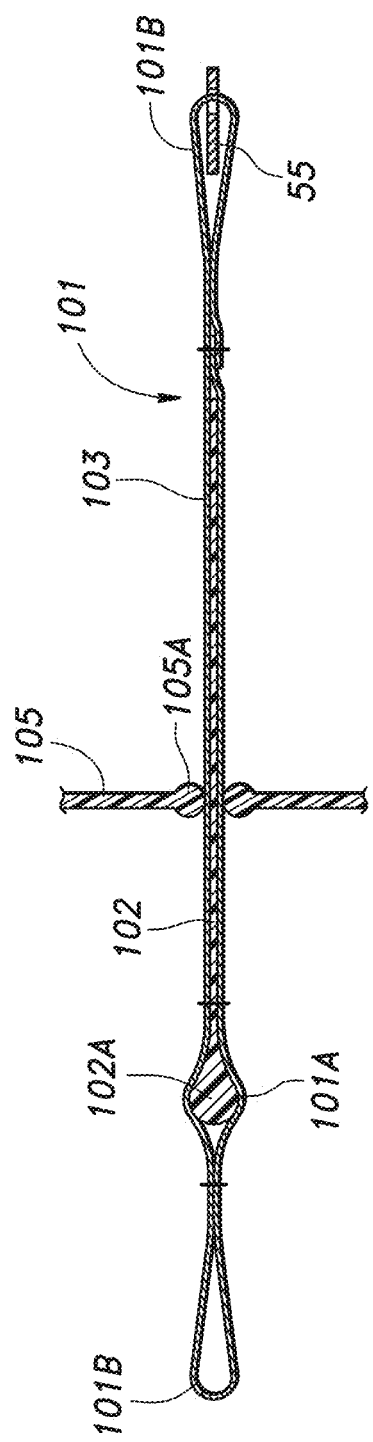
Fig.9A
Fig.9B

VEHICLE SEAT

CROSS REFERENCE TO RELATED APPLICATIONS

This application is a continuation of U.S. patent application Ser. No. 18/073,194 filed on Dec. 1, 2022, which is a continuation of U.S. patent application Ser. No. 17/171,012 filed on Feb. 9, 2021 (now U.S. Pat. No. 11,529,891 issued on Dec. 20, 2022), which a continuation of U.S. patent application Ser. No. 16/321,156 filed on Jan. 28, 2019 (now U.S. Pat. No. 10,946,773 issued on Mar. 16, 2021), which is the U.S. National Stage entry of International Application No. PCT/JP2017/013554 filed under the Patent Cooperation Treaty on Mar. 31, 2017, which claims priority to Japanese Patent Application No. 2016-153141 filed on Aug. 3, 2016, all of which are incorporated herein by reference in their entireties for all purposes.

TECHNICAL FIELD

The present invention relates to a vehicle seat adapted to be mounted on a vehicle such as an automobile.

BACKGROUND ART

Known motor vehicle seats include a tumble seat, which is typically used in a second or third row of seat(s) and configured to pivot frontward, together with a seat back folded onto the seat, about an axis in a front portion thereof to take an upright stowed position. Some known tumble seats are provided with a spring (or gas damper) between a floor and a seat cushion so as to urge rotation of the seat to thereby facilitate a tuck-away operation; that is, a frontward rotation of the seat cushion (See Patent Document 1).

PRIOR ART DOCUMENT (S)

Patent Document(s)

Patent Document 1: JPH5-63968A

SUMMARY OF THE INVENTION

Task to be Accomplished by the Invention

However, when a gas spring is provided between a floor and a seat cushion of a tumble seat, an urging force always act on part of the seat cushion side, and thus a gas spring provided at an improper location can distort a seat cushion frame or other parts of the seat cushion. In particular, in cases where a seat cushion of a tumble seat is provided with slide rails which allow the seat cushion to horizontally move with regard to a floor and also provided with a gas spring, when an urging force generated by the gas spring acts on the slide rails, the urging force generated by the gas spring can distort the slide rails, thereby inhibiting the smooth movement of the slide rails.

The present invention has been made in view of such problems of the prior art, and a primary object of the present invention is to provide a vehicle tumble seat configured to prevent distortion of slide rails caused by an urging force generated by an urging member.

Means to Accomplish the Task

In order to attain the above object, an aspect of the present invention provides a vehicle seat capable of taking a stowed position in which a seat back (6L) is folded onto a seat cushion (5L) and the seat cushion (5L) together with the folded seat back (6L) is rotatably lifted away from a floor (3), the vehicle seat including: a support member (31) coupled to the floor; a rotating member (33L) rotatably supported by the support member via a support shaft extending in a right-left direction; a lower rail (41) extending in a front-rear direction and coupled at an end to the rotating member so as to be extend literally offset relative to the support shaft; an upper rail (42) slidably supported by the lower rail and coupled to the seat cushion; a coupling device (51) provided at a second end of the lower rail on a side toward the support shaft and capable of selectably connecting to the floor; and an urging device (60) extending the front-rear direction and having one end coupled to the support member and a second end coupled to the lower rail on the side toward the support shaft side, wherein the urging device is configured to be expandable and contractible in a longitudinal direction thereof so as to urge the seat cushion in such a direction as to rotate about the support shaft away from the floor.

In this configuration, the support shafts and the coupling devices, which are secured to the floor, are disposed both frontward and rearward of the urging device which generates an urging force in the front-rear direction. Thus this configuration restricts the expansion of the urging device, thereby suppressing the deformation of the lower rail and the seat cushion to which the urging device is coupled. As a result, the upper rail is allowed to smoothly move relative to the lower rail.

In the above-described aspect, the support shaft, the urging device, and the coupling device are arranged on an imaginary straight line extending in the front-rear direction.

In this configuration, the urging force generated by the urging device is more securely transmitted to the coupling device, resulting in that the deformation of the lower rail is suppressed.

In the above-described aspect, it is preferable that the second end of the lower rail is coupled to a reinforcing member (48), and that the coupling device and the second end of the urging device are coupled to the reinforcing member.

In this configuration, the urging force generated by the urging device is transmitted to the coupling device via the reinforcing member, resulting in that the deformation of the lower rail is suppressed.

In the above-described aspect, it is preferable that the coupling device includes a latch (51C) configured to be engageable with a striker (52) provided on the floor, and that the latch is rotatable about an axis line extending in the right-left direction and is arranged such that the latch, viewed from the right-left direction, has an upper part which overlaps the lower rail and a lower part which protrudes downward beyond the lower rail.

In this configuration, the distance between the lower rail and the floor is smaller. Thus, a smaller dead space is created between the seat cushion and the floor.

In the above-described aspect, the support shaft, the coupling device, and the urging device are preferably disposed within an inner region of the vehicle seat in the right-left direction.

In this configuration, the urging device is arranged on a center portion of the left seat in the right-left direction. Thus, this configuration reduces a difference between the loads applied on the right and left halves of the seat cushion, thereby suppressing the deformation of the seat cushion. Since the support shaft, the coupling device, and the urging device are disposed within an inner region of the vehicle seat, the support shaft, the coupling device, and the urging device are hardly visible from the outside and a user is prevented from unintentionally touching the urging device.

In the above-described aspect, it is preferable that the rotating member includes a front end portion rotatably supported by the support shaft and a rear end portion offset outward relative to the front end portion in the right-left direction of the vehicle seat, and that a front end portion of the lower rail is coupled to the rear end portion of the rotating member.

In this configuration, the support shaft and the lower rail are positionally offset relative to each other by the rotating member.

In the above-described aspect, it is preferable that the lower rail is coupled to the rotating member at a front end, that a rail locking device (43) is provided between the upper rail and the lower rail and configured to selectively hold a position of the upper rail with respect to the lower rail, that a rail urging member (56) is provided and configured to urge the seat cushion frontward relative to the lower rail, and that the rail locking device is coupled to the seat back via a power transmission member (45), and configured such that, when the seat back is folded toward the seat cushion at an angle within a prescribed angular range, the rail locking device is driven by the power transmission member to enable the upper rail to move with respect to the lower rail.

In this configuration, when the seat back is folded onto the seat cushion, the seat cushion moves to the front end position with respect to the lower rail, thereby enlarging a space rearward of the seat.

In the above-described aspect, it is preferable that the coupling device includes: a latch (51C) configured to be engageable with a striker (52) provided on the floor; an operating input part (55) configured such that a user's operating force is input to the operating input part; a connecting mechanism (54) configured to selectively transmit the operating force from the operating input part to the latch; and a slide position detecting device (62) provided between the seat cushion and the lower rail and configured to operate when the seat cushion is at a prescribed front end position relative to the lower rail, and that, when the seat cushion is at the front end position, the connecting mechanism is driven by the slide position detecting device to transmit the operating force from the operating input part to the latch.

In this configuration, the coupling device is allowed to be unlocked only when the seat cushion 5L is at the front end position with respect to the lower rail. Thus, the vehicle seat is allowed to move to the stowed position with the seat cushion at the front end position with respect to the lower rail and the enlarged space created rearward of the seat.

Effect of the Invention

In the above-described configurations, a vehicle tumble seat can be configured to prevent distortion of slide rails caused by an urging force generated by an urging member.

BRIEF DESCRIPTION OF THE DRAWINGS

FIG. 7A shows the device in a non-operating position,
and FIG. 7B shows the device in an operating position;
FIG. 8A shows the device in a disconnected state,
and FIG. 8B shows the device in a connected state;
FIG. 9A is a perspective view of a strap;
FIG. 9B is a cross-sectional view of the strap.

DESCRIPTION OF THE PREFERRED EMBODIMENT(S)

Figure 1:
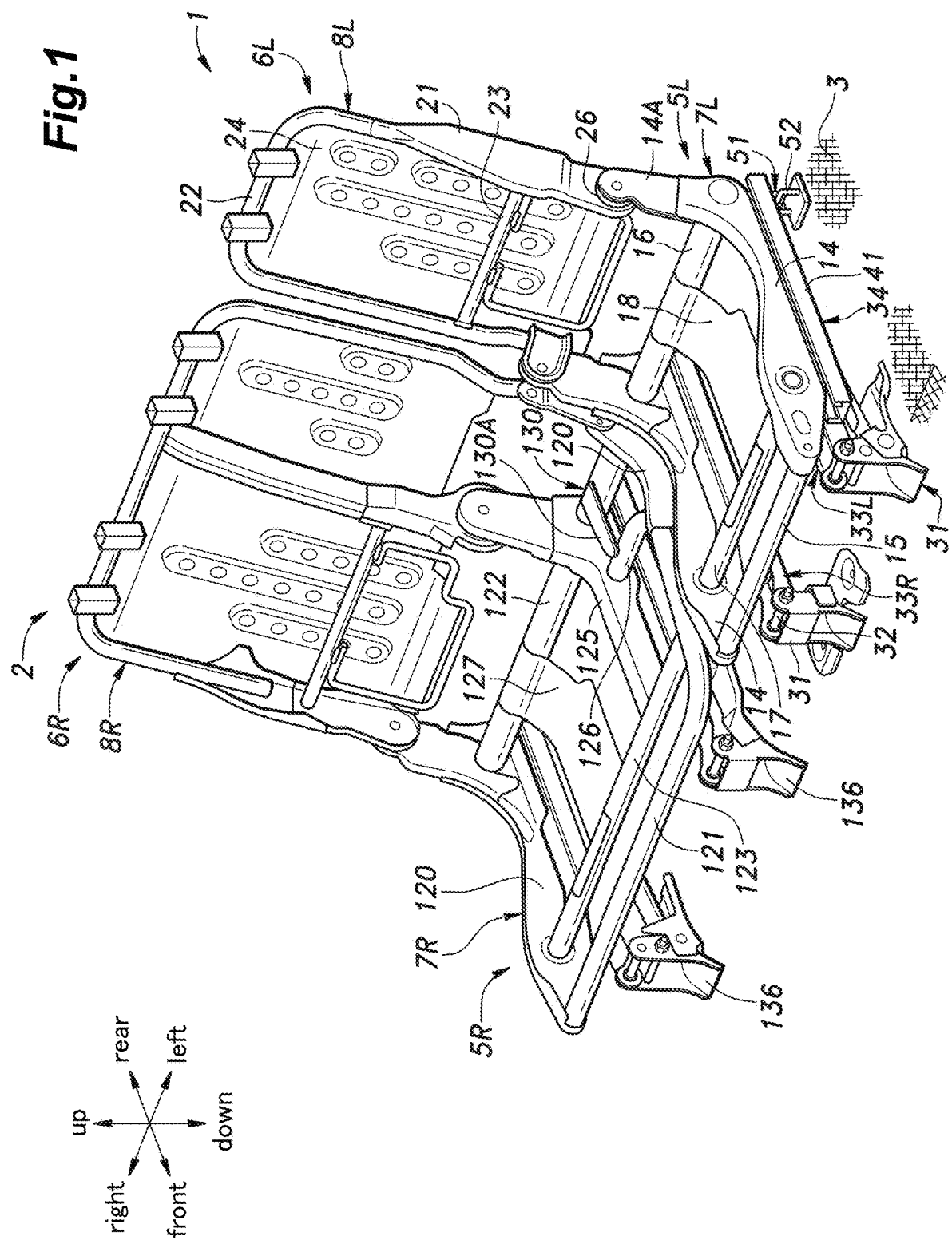
FIG. 1 is a perspective view from front left of vehicle seat frames according to an embodiment of the present invention.

A vehicle rear seat (for e.g. a second row or third row of seat(s)) according to one embodiment of the present invention will be described with reference to the drawings. In the following description, the directions of right and left are defined as those for an occupant seated on the seat. In the right-left direction, an "inner side" refers to a side on which the center of the seat is located, and an "outer side" refers to a side away from the center of the seat. A pair of same parts or features provided on either of the right and left sides are designated by the same reference numeral and the description of each part or feature will not be repeated. As will be described later, a seat is movable between a usable position (seating position) and an upright stowed position and has different forms and orientations in the respective positions. However, description will be made with reference to a seat in the usable position unless otherwise specified.

As shown in FIG. 1, a row of rear seats of an automobile includes a left seat 1 on the left, and a right seat 2 used as a rightmost seat and a center seat. The seats 1 and 2 include seat cushions 5L, 5R rotatably provided on a floor 3 of the automobile and seat backs 6L, 6R rotatably supported by the seat cushions 5L, 5R, respectively. The seat cushions 5L, 5R have respective seat cushion frames 7L, 7R, and the seat backs 6L, 6R have respective seat back frames 8L, 8R, all the frames forming the shapes of respective cushions and seat backs. The seat cushions 5L, 5R and the seat back 6L, 6R, the seat cushion frames 7L, 7R and the seat back frames 8L, 8R support respective pads, each pad being covered with a skin material.

[Left Seat]

The seat cushion frame 7L of the left seat 1 includes a pair of right and left cushion side frames 14 extending in the front-to-rear direction, a front member 15 crossing and connecting respective front end portions of the cushion side frames 14, a rear member 16 crossing and connecting respective rear end portions of the cushion side frames 14, an intermediate member 17 crossing and connecting respective intermediate portions between the respective front and rear end portions of the cushion side frames 14, and a plate-shaped cushion pan frame 18 crossing and hanging between respective intermediate portions of the intermediate member 17 and the rear member 16, where the intermediate portions are located between the respective right and left ends of the intermediate member 17 and the rear member 16. The respective rear end portions of the cushion side frame 14 protrude upward to form a seat back support 14A. For example, each of the cushion side frames 14 and the cushion pan frame 18 is formed of a steel-metal member. The front member 15, the rear member 16, and the intermediate member 17 may be formed of metal pipes.

The seat back 6L of the left seat 1 includes a pair of right and left rear side frames 21 extending vertically, an upper member 22 crossing and connecting the respective upper end portions of the backside frames 21, a lower member 23 crossing and connecting the respective lower end portions of the backside frames 21, and a plate-shaped back pan frame 24, plate-shaped back pan frame 24 covering a frame-shaped rear portion formed by the right and left backside frames 21, the upper member 22, and the lower member 23. The respective lower end portions of the right and left backside frames 21 are rotatably supported by the right and left seat back supports 14A via respective reclining mechanisms 26. The reclining mechanism 26 may be any known reclining mechanism, which is used to lock the rotational position of the backside frame 21 to the cushion side frame 14 at any vertical position and also enables the backside frame 21 to rotate with respect to the cushion side frame 14 when a prescribed tensile load is applied to an operating input part of the reclining mechanism 26. The operating input part of each right and left reclining mechanisms 26 is connected to a reclining operating lever (not shown) via a first control cable (not shown). The control cable as a power transmission member may be any publicly known cable having a cylindrical outer case and an inner cable movably extending through in the outer case. A user can operate the reclining operating lever to apply a tensile load to the operating input part of each of the right and left reclining mechanisms 26 via the first control cable, thereby enabling each reclining mechanism 26 to rotate. The reclining operating lever may be provided, for example, at the upper end of the left side backside frame 21.

The seat cushion 5L is rotatably supported by the floor 3 of an automobile body via a pair of right and left support members 31 coupled to the floor 3, a pair of right and left rotating members 33R, 33L rotatably supported by the support members 31 via support shafts 32 extending in the right-left direction of the respective support members 31, and a pair of right and left slide rails 34 coupled to respective rotating member 33R, 33L.

As shown in FIGS. 2 to 6, each support member 31 has upper and lower main faces and includes a bottom wall 31A coupled to the upper surface of the floor 3, and a pair of right and left support walls 31B protruding upward from the bottom wall 31A and having their respective right and left main faces. The bottom wall 31A and the support walls 31B are formed of one steel-metal member or multiple steel-metal members joined to one another. The right and left support walls 31B may be connected to each other by bolts or reinforcing walls.

The support shaft 32 crosses and connects the two upper end portions of each support member 31. The support shaft 32 is coupled to each support member 31 by thread connection, welding or other coupling methods.

The left rotating member 33L is rotatably supported by the support shaft 32 at its front end portion. The rotating member 33L extends rearward from the front end portion to form its rear end portion extending positionally offset to the left relative to the front end portion. The left rotating member 33L has first, second, and third members 37, 38 39 which are steel-metal members joined together. The first member 37 includes an upper wall part 37A extending in the front-rear direction, and right and left side wall parts 37B protruding downward from right and left side edges of the upper wall part 37A, and the first member 37 defines a groove portion that opens downward and extends in the front-rear direction. Front end portions of the right and left side wall parts 37B of the first member 37 define respective bearing holes 37C so as to extend through the respective side wall parts coaxially with each other. The support shaft 32 is inserted to pass through the bearing holes 37C. The second member 38 includes a bottom wall part 38A with an upper main face and a right side wall part 38B protruding upward from and extending along the right side edge of the bottom wall part 38A. The bottom wall part 38A of the second member 38 includes its rear end portion extending positionally offset to the left (i.e. outwardly of the seat) relative to its front end portion. The right side wall part 38 B of the second member 38 includes its front end portion extending in the front-rear direction, its intermediate portion extending in a direction at an angle to the front-rear direction, and a rear end portion part extending in the front-rear direction positionally offset to the left relative to the front end portion. The first member 37 includes its rear end portion disposed above the right front portion of the second member 38, and its front portion protrudes frontward from the second member 38. A right side face of the side wall part 37B on the right side of the first member 37 is in contact with a left side face of the right side wall part 38B of the second member 38. The third member 39 includes a lower wall part 39A extending in the front-rear direction, and right and left side wall parts 39B protruding upward from the right and left side edges of the lower wall part 39A, and the third member 39 defines a groove portion that opens upward and extends in the front-rear direction. The third member 39 is arranged on an upper side face of a left rear portion of the bottom wall part 38A of the second member 38. The third member 39 is disposed to be positionally offset to the left relative to the first member 37 and the support shaft 32, and is arranged so that its right front end portion overlaps the left rear part of the first member 37 as viewed from above. A left side face of the right side wall part 39B of the third member 39 is in contact with the right side face of the left side wall part 37B of the first member 37. A right side face of the right side wall part 39B of the third member 39 is in contact with a left side face of the rear end portion of the right side wall part 38B of the second member 38. The first, second, and third members 37, 38, 39 are coupled to each other by welding or other coupling methods at proper locations. The first, second, and third members 37, 38, 39 cooperatively form a closed cross section structure at a right front portion of the rotating member 33L. Moreover, the third member 39 defines a groove portion that opens upward and extends in the front-rear direction at a rear left portion of the rotating member 33L.

The rotating member 33R on the right side, which extends in the front-rear direction, is formed in a groove shape opened upward and is rotatably supported by the support shaft 32 at the front end portion.

Each slide rail 34 includes a lower rail 41 extending in the front-rear direction, an upper rail 42 movably supported by the lower rail 41 to be movable in the front-rear direction, and a rail locking device 43 (see FIG. 3) for selectively holding a position of the upper rail 42 with respect to the lower rail 41. Each lower rail 41 includes a bottom wall part having upper and lower main faces and extends in the front-rear direction, right and left side wall parts protruding upward substantially at the right angle from the right and left side edges of the bottom wall part, and upper wall parts protruding inwardly substantially at the right angle from the upper edges of respective bottom wall parts. The upper rail 42 includes a base accommodated in the lower rail 41, and a protrusion protruding upward through the gap between the base and the upper wall parts of the lower rail 41.

A rail locking device 43 locks a position of the upper rail 42 with respect to the lower rail 41 when any external operating force is not applied thereto, and enables the upper rail 42 to move with respect to the lower rail 41 when an external operating force is applied thereto. The rail locking device 43 may have a known configuration, and may be provided in each of the right and left lower rails 41, for example. The rail locking device 43 includes engaging pieces (not shown) engageable with the lower rail 41 and the upper rail 42, an urging member (not shown) configured to urge the engaging pieces in such a direction that the engaging pieces are in contact with the lower rail 41 and the upper rail 42, respectively, and a common rail lock operating lever 43A connected to the engaging pieces and protruding outward from the lower rail 41. The rail lock operating lever 43A is common to the right and left slide rails 34. In an initial state where the rail lock operating lever 43A is not operated, the right and left slide rails 34 lock the position of the upper rail 42 with respect to the lower rail 41 as the engaging pieces urged by the urging member engage with the lower rail 41 and the upper rail 42. In an operation state where the rail lock operating lever 43A is operated against an urging force of the urging member, the right and left slide rails 34 enable the upper rail 42 to move with respect to the lower rail 41 as at least one of the engaging pieces disengages from at least a corresponding one of the lower rail 41 and the upper rail 42.

Figure 2:
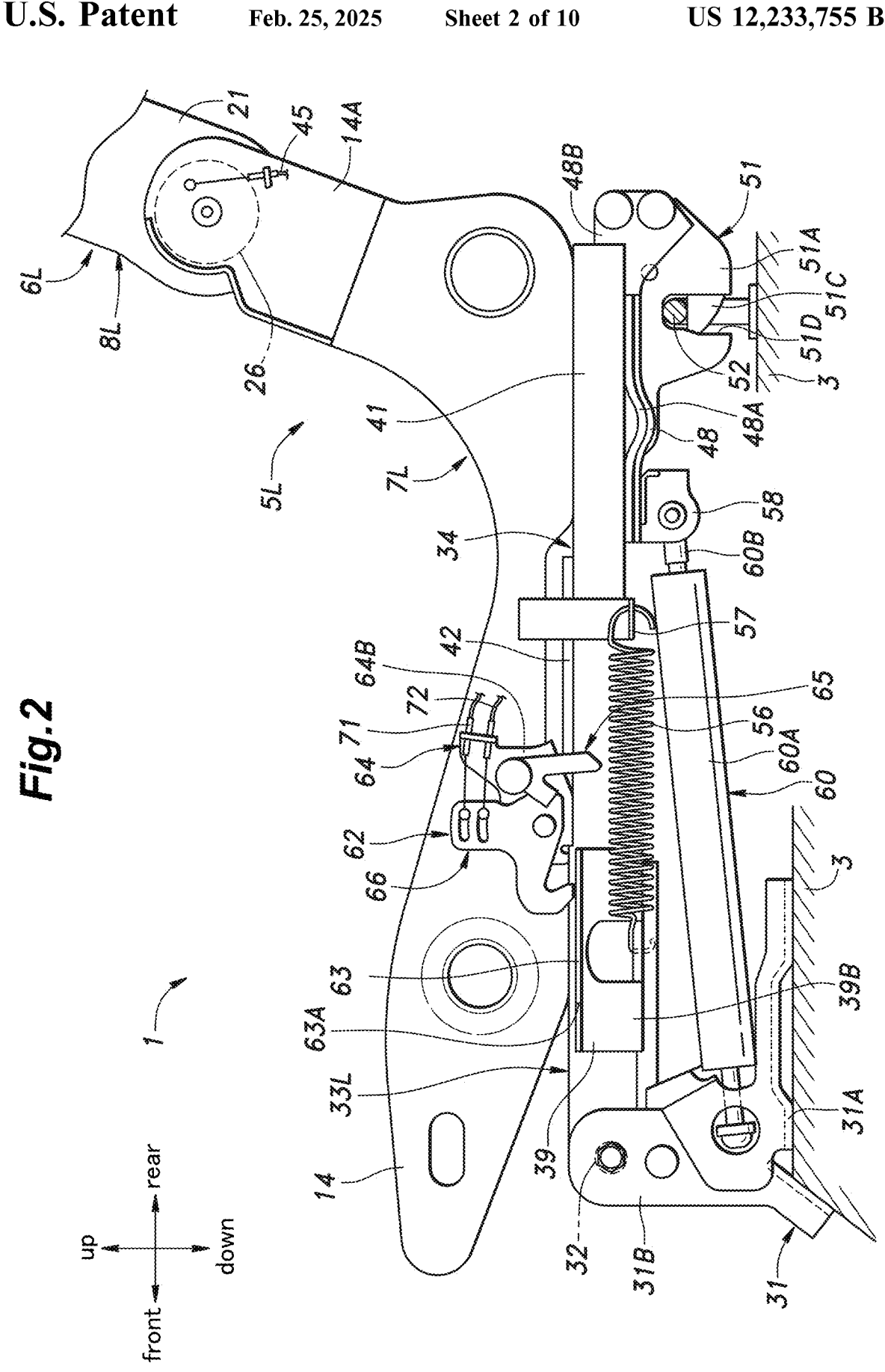
FIG. 2 is a left side view of the lower portion of the left seat.

The rail lock operating lever 43A is coupled to the backside frame 21 on the left seat back frame 8L via a second control cable (power transmission member) 45 (see FIG. 2). When the seat back 6L is folded toward the seat cushion 5L at angles within a prescribed angular range, the second control cable 45 is pulled toward the side of the seat back frame 8L to operate the rail lock operating lever 43A. In this way, when the seat back 6L is folded toward the seat cushion 5L, the rail locking device 43 is unlocked for a certain period of time to thereby enable the upper rail 42 to move with respect to the lower rail 41. When the seat back 6L is completely folded onto the seat cushion 5L, the tension applied to the second control cable 45 is reduced to bring the rail locking device 43 in its locking state again.

Figure 3:
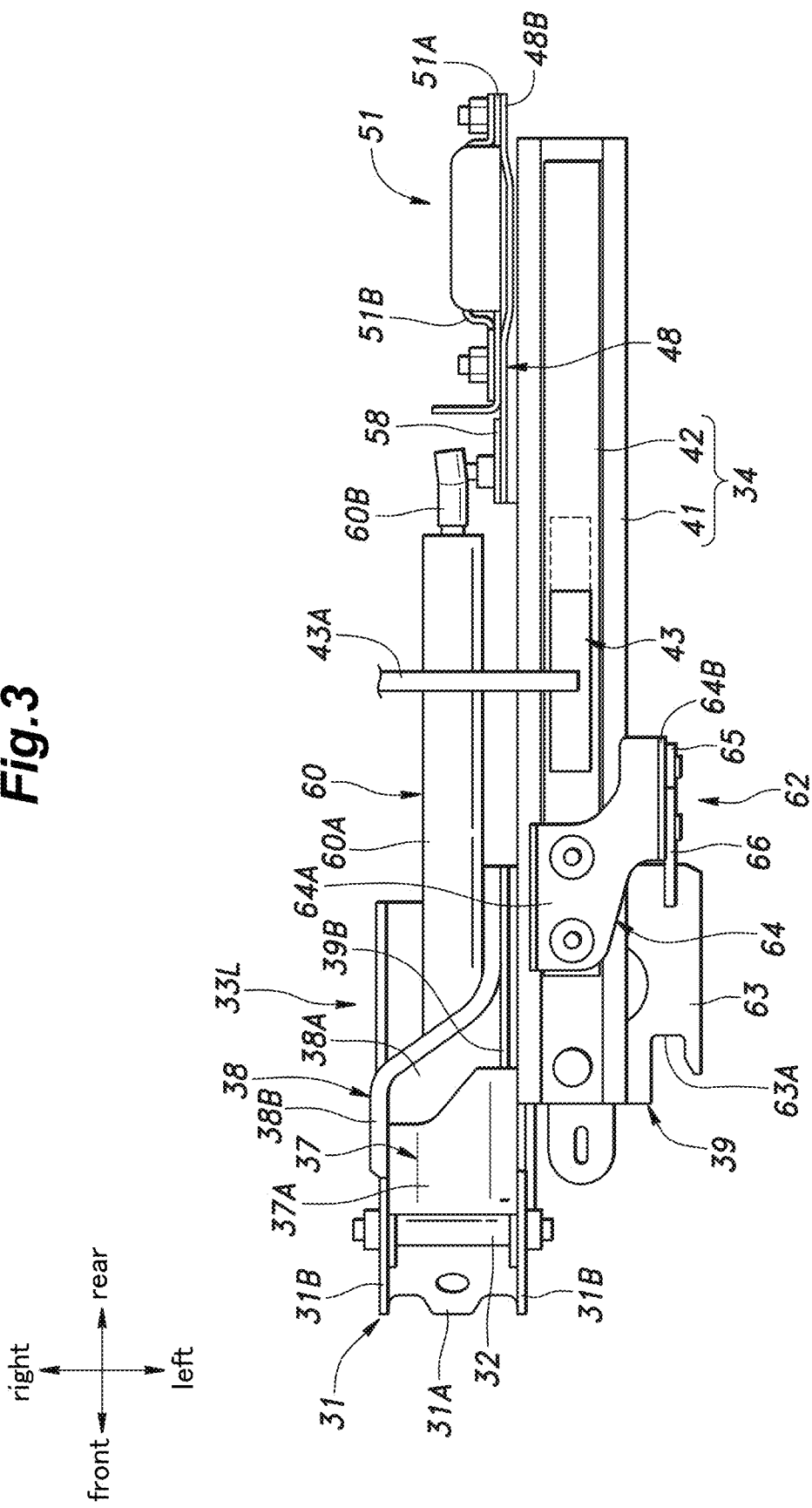
FIG. 3 is a plan view showing a critical part of the lower left side of the left seat.

As shown in FIG. 3, the lower rail 41 of the slide rail 34 on the left side is coupled to the left rotating member 33L. Specifically, a front end portion of the lower rail 41 is received in the groove portion formed by the third member 39 of the rotating member 33L and fastened to the lower wall part 39A of the third member 39 and the bottom wall part 38A of the second member 38 by fastening members such as bolts. When being coupled to the rotating member 33L, the lower rail 41 is arranged to be positionally offset to the left with respect to the support shaft 32 and the first member 37.

Figure 4:
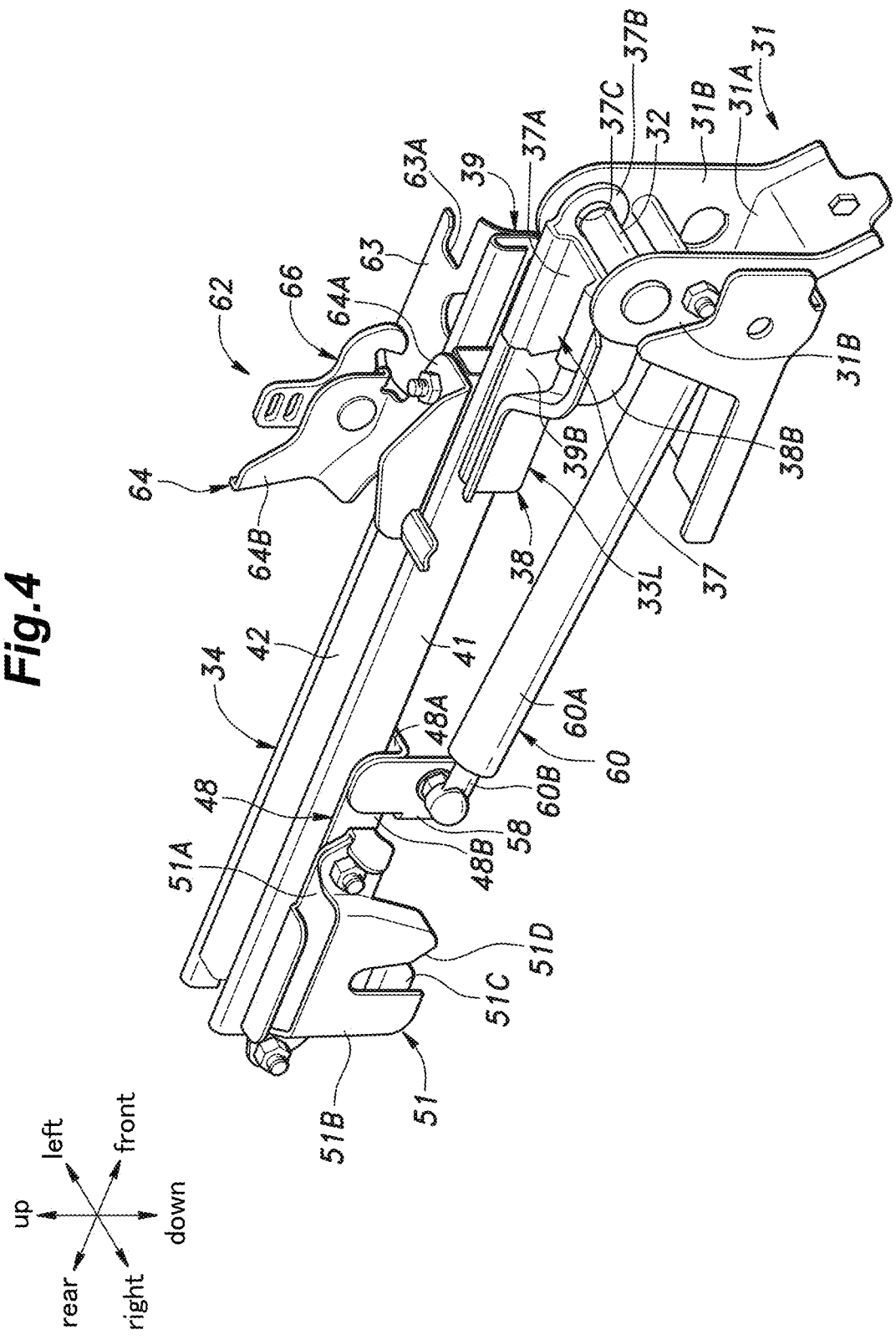
FIG. 4 is a perspective view from front right showing the critical part of the lower left side of the left seat.
Figure 5:
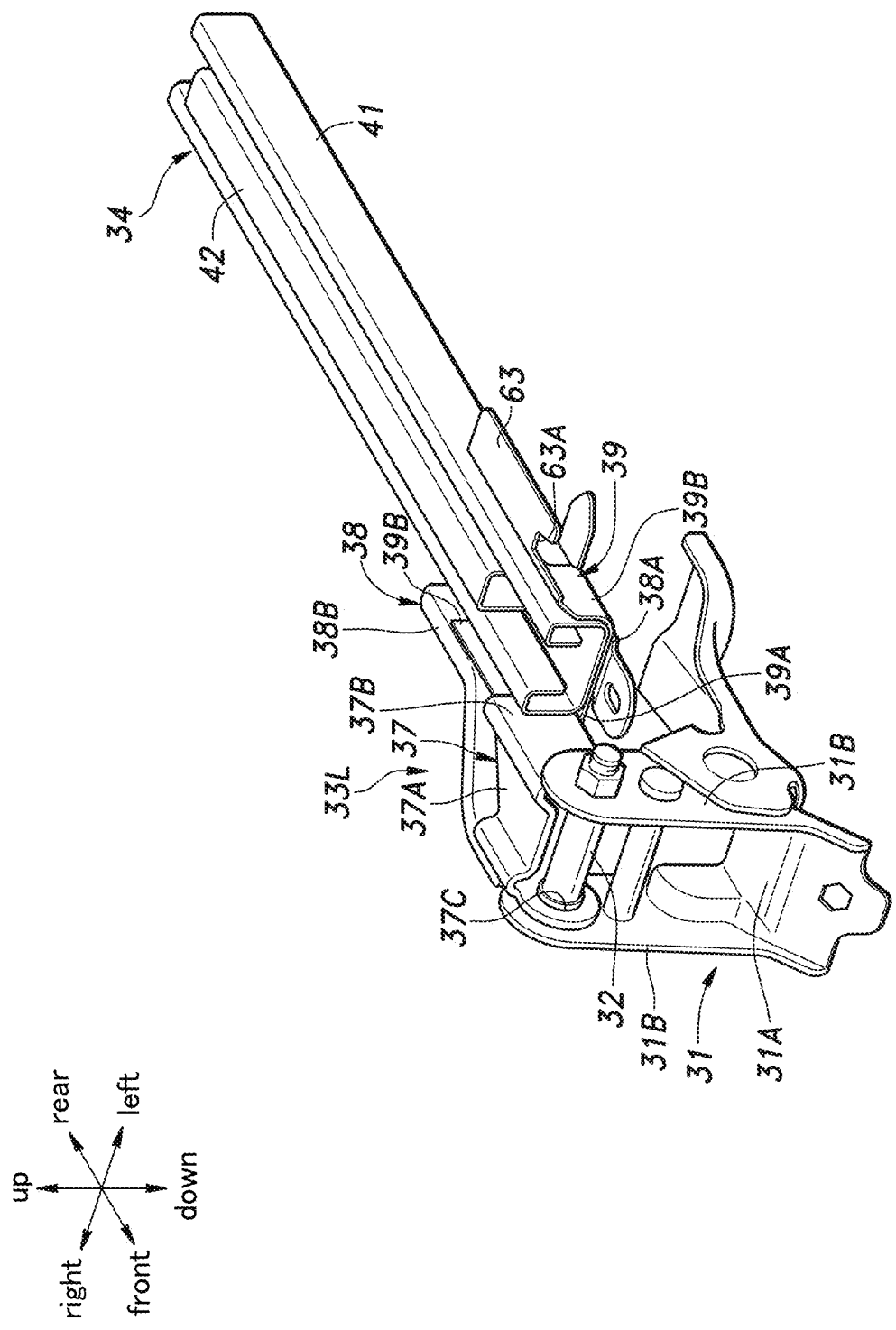
FIG. 5 is a perspective view from front left showing the critical part of the lower left side of the left seat.
Figure 6:
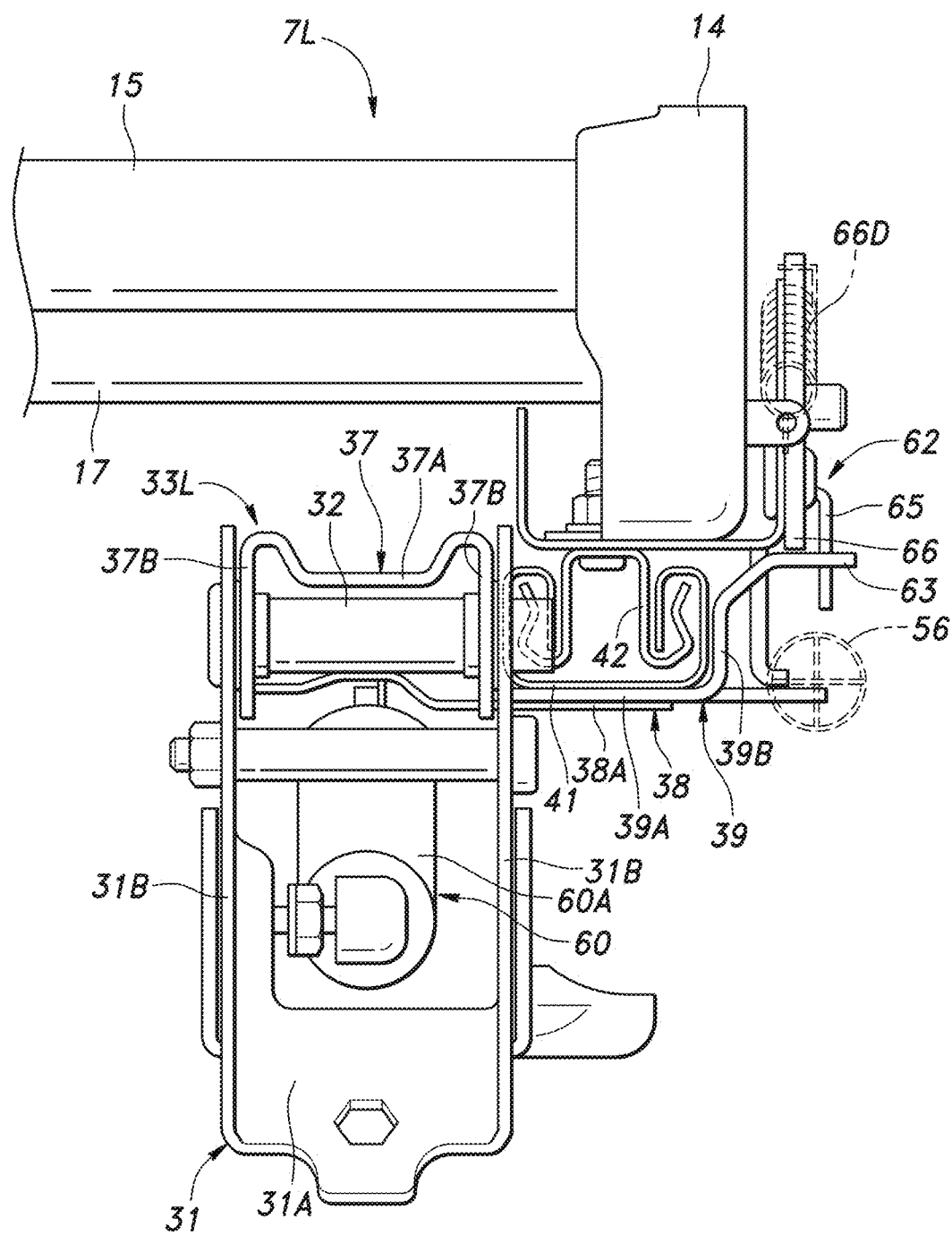
FIG. 6 is a front view showing the critical part of the lower left side of the left seat.

As shown in FIGS. 3 and 4, a reinforcing member 48, which is a steel-metal member, is coupled to the bottom wall part and the right side wall part at a rear portion of the left lower rail 41. The reinforcing member 48 includes a lower wall part 48A extending back and forth along the bottom wall part of the lower rail 41, and a side wall part 48B protruding upward from the right side edge of the lower wall part 48A and extending in the front-rear direction along the right side wall part of the lower rail 41, and the reinforcing member 48 has an L-shaped cross section as seen from the front and the rear. The lower wall part 48A of the reinforcing member 48 is coupled to the bottom wall part of the lower rail 41 by fastening members such as bolts and nuts. In other embodiments, the side wall part 48B of the reinforcing member 48 may be coupled to the right side wall part of the lower rail 41.

A coupling device 51 is coupled to the rear end portion of the side wall part 48B of reinforcing member 48. The coupling device 51 includes a casing comprised primarily of a base plate 51A and a cover plate 51B, which are steel-metal members, and a hook-shaped latch 51C rotatably supported by and in the casing. The base plate 51A and the cover plate 51B are arranged such that their right and left main faces are opposed to and face each other. The cover plate 51B is fastened to the base plate 51A at its front and rear ends, and has an intermediate portion between the front and rear ends bulges away from the base plate 51A. As a result, an internal space is defined between the base plate 51A and the cover plate 51B at the intermediate portion between the front and rear ends. The portions defining the internal space between the base plate 51A and the cover plate 51B are fastened to each other via spacers (not shown). The portion of the cover plate 51B forming the inner space has its lower edge, which is bent toward the base plate 51A so as to close the lower edge of the inner space.

In the lower portions of the base plate 51A and the cover plate 51B, slits 51D are defined through the thicknesses of the plates and extend upward. The slits 51D defined in the base plate 51A and the cover plate 51B are formed to have the same shapes when viewed from right and left sides. The latch 51C is arranged in the internal space and is rotatably supported by the base plate 51A and the cover plate 51B. The latch 51C is rotatable around a rotation shaft extending in the right-left direction and is rotated between a lock position in which the latch protrudes to lower parts (opening end sides) of the slits 51D and a unlock position in which the latch 51C is retreated from the slits 51D. The latch 51C is urged toward the lock position by a spring.

The coupling device 51 is arranged so that the base plate 51A is in contact with the right side face of the side wall part 48B of the reinforcing member 48, and is fastened to the side wall part 48B of the reinforcing member 48 by one or more fastening members such as bolts and nuts, which fastening members combine the cover plate 51B, the base plate 51A, and the side wall part 48B of the reinforcing member 48 together. The coupling device 51 is fastened to the side wall part 48B of the reinforcing member 48 by the fastening members at one position on the front end portion and at two positions at the rear end portion. In other embodiments, the fastening member fastening the cover plate 51B to the base plate 51A and the fastening member fastening the cover plate 51B to the reinforcing member 48 may be separate fastening members. The coupling device 51 is arranged such that, when the coupling device 51 is coupled to the reinforcing member 48, an upper part of the coupling device 51 overlaps the lower rail 41 when viewed from right and left, and the slits 51D are located below the bottom wall part of the lower rail 41. In this case, an upper part of the latch 51C may be arranged so as to overlap the lower rail 41 viewed from right and left.

As shown in FIG. 3, the support shaft 32 and the coupling device 51 are disposed positionally offset to the same side (right side) with respect to the lower rail 41. In other words, the coupling device 51 is disposed at a location straight rearward and separated from the support shaft 32.

As shown in FIG. 1, the lower rail 41 of the right slide rail 34 is coupled to the right rotating member 33R. Specifically, the front end portion of the lower rail 41 is received in the groove portion of the rotating member 33R and fastened to the rotating member 33R by one or more fastening members such as bolts and nuts. The reinforcing member 48 and the coupling device 51 are provided on a rear portion of the right lower rail 41 in the same manner as the left lower rail 41. The reinforcing member 48 and the coupling device 51 are configured and arranged in the right slide rail 34 in a bilaterally symmetric manner with the above-described the reinforcing member 48 and the coupling device 51 in the left slide rail 34, and thus these elements in the right slide rail will not be discussed here.

The upper rail 42 of the left slide rail 34 is coupled to the left cushion side frame 14 and the upper rail 42 of the right slide rail 34 is coupled to the right cushion side frame 14. When viewed from above, the left slide rail 34 and the left cushion side frame 14 are arranged so as to overlap each other, and the right slide rail 34 and the right cushion side frame 14 are arranged so as to overlap each other.

As shown in FIGS. 1 and 2, strikers 52 protruding upward are provided on the floor 3 in regions corresponding to the slits 51D of the right and left coupling devices 51. Each striker 52 includes a pair of right and left pillars extending upward from the floor 3 and a beam crossing and connecting the upper ends of the pillars to form a gate-like shape.

As shown in FIG. 2, when the left seat 1 takes the usable position, the upper ends of the slits 51D of the right and left coupling devices 51 rest on the beams of the strikers 52 provided at locations corresponding to the coupling devices 51 of the seat. An outer edge (lower edge) of each latch 51C which is in its locked position is inclined with respect to the horizontal plane. As a result, when the striker 52 enters the slit 51D, the striker 52 pushes the latch 51C toward its unlock position against an urging force generated by the urging member. When the striker 52 reaches the upper end portion of the slit 51D, the latch 51C returns to the lock position by the urging force generated by the urging member so as to prevent the striker 52 from leaving the slit 51D.

As shown in FIGS. 8 and 9, each of the right and left latches 51C is connected to an unlatch lever 55 via a corresponding third control cable 53 and a connecting mechanism 54. The unlatch lever 55 is connected to a strap 101, which an occupant can grasp in order to perform a pulling operation.

As shown in FIG. 2, an urging member 56 is provided between the left rotating member 33L and the left cushion side frame 14 for urging the upper rail 42 and the seat cushion frame 7L frontward relative to the lower rail 41. In the present embodiment, the urging member 56 is a tension coil spring having one end hooked on the third member 39 of the rotating member 33L and the other end hooked on a spring engaging piece 57 provided on the left side cushion side frame 14.

As shown in FIG. 4, a bracket 58 protruding downward is coupled to a front part of the side wall part 48B of the left reinforcing member 48. As shown in FIGS. 2 to 6, an urging device 60 is provided between the left support member 31 and the left bracket 58. The urging device 60 is a linearly expandable and contractible device including a cylinder 60A and a rod 60B, in which the rod 60B is capable of advancing and retracting in the longitudinal direction with respect to the cylinder 60A and is urged in such a direction as to protrude out of the cylinder 60A. In the present embodiment, the urging device 60 is a known gas spring where compressed gas is contained in the cylinder 60A. In other embodiments, the urging device 60 may include the rod 60B urged against the cylinder 60A by other urging means such as a compression coil spring. When being contracted, the urging device 60 generates resistance force caused by the compressed high pressure gas, and can also function as a damping device. When the coupling device 51 is coupled to the striker 52, the urging device 60 is contracted in such a state that the urging force is generated within the device.

In the present embodiment, the urging device 60 extends in the front-rear direction, and the front end of the urging device 60, which is a proximal end part of the cylinder 60A, is rotatably connected to the right side wall of the support member 31 so as to be rotatable about an axis extending in the right-left direction, whereas a rear end of the urging device 60, which is a distal end part of the rod 60B, is rotatably connected to the bracket 58 so as to be rotatable about an axis extending in the right-left direction. As shown in FIG. 3, the support shaft 32, the urging device 60, and the coupling device 51 are arranged on an imaginary straight line extending in the front-rear direction.

As shown in FIGS. 2 to 4 and 7, a slide position detecting device 62 is provided between the upper rail 42 and the lower rail 41 of the left slide rail 34 for detecting whether or not the upper rail 42 is located at a prescribed front end position with respect to the lower rail 41. The slide position detecting device 62 includes an engaging plate 63 coupled to the third member 39 of the rotating member 33L, a bracket 64 coupled to the upper rail 42, a first link 65, and a second link 66, and the first and second links are members rotatably supported by the brackets 64. The engaging plate 63 is formed as a part of the third member 39, extends out to the left from the upper edge of the left side wall, and has upper and lower main faces. A front portion of the engaging plate 63 defines an engaging notch 63A extending through the thickness of the engaging plate in the vertical direction (in the up-down direction).

The bracket 64 has a base 64A coupled to the upper rail 42 and a support portion 64B extending from the base 64A above the upper side of the engaging plate 63, and the support portion 64B has main faces facing right and left and extending in the front-rear direction above the engaging plate 63. The first link 65 and the second link 66 are rotatably supported on the left side face of the support portion 64B so as to be rotatable about an axis extending in the right-left direction. The first link 65 is disposed in a rear portion the support portion 64B, and includes an abutting piece 65A and a first engaging piece 65B which protrude in different radial directions around the rotation axis of the first link 65. The abutting piece 65A is formed to be longer than the first engaging piece 65B in the radial direction. The first link 65 is urged in the clockwise direction when viewed from left by a first spring 65C, which is a screw recoil spring provided between the first link 65 and the bracket 64. A stopper (not shown) is provided in the bracket 64 for restricting the rotation of the first link 65 in the clockwise direction at a prescribed position. As shown in FIG. 7A, when the first link is in an initial position where the first link 65 abuts against the stopper, the abutting piece 65A extends downward from the rotation axis of the first link 65, and the first engaging piece 65B extends obliquely frontward and downward from the rotation axis of the first link 65.

The second link 66 is provided on the support portion 64 frontward of the first link 65B. The second link 66 includes a second engaging piece 66A, a locking piece 66B, and an operating piece 66C, which are plate pieces protruding in different radial directions about the rotation axis of the second link 66. The second link 66 is urged in the counterclockwise direction when viewed from left by a second spring 66D, which is a tension coil spring provided between the second link 66 and the bracket 64. The locking piece 66B is formed in a hook shape curved in the counterclockwise direction when viewed from left. A fourth control cable 71 and a fifth control cable 72 are coupled to the operating piece 66C such that the fourth control cable 71 has one end coupled to the operating piece 66C and the other end coupled to the connecting mechanism 54, and that the fifth control cable 72 has one end coupled to the operating piece 66C and the other end coupled to the rail lock operating lever 43A.

A, a stopper (not shown) is provided on the bracket 64 for restricting the rotation of the second link 66 in the counterclockwise direction at a prescribed position. As shown in FIG. 7B, when the second link 66 abuts against the stopper, the second link 66 is in its operating position. When the second link 66 is in the operating position, the locking piece 66B having a hook-like shape protrudes downwards and is allowed to enter the engaging notch 63A of the engaging plate 63. As shown in FIG. 7A, when the first link 65 is in the initial position, the second engaging piece 66A abuts against the first engaging piece 65B in the radial direction so that the rotation of the second link 66 in the counterclockwise direction is restricted. In this state, the second link 66 is in its non-operating position. When the second link 66 is in the non-operating position, an end of the locking piece 66B is separated above from an upper face of the engaging plate 63.

As shown in FIG. 7A, when the seat cushion 5L and the upper rail 42 are located rearward of the lower rail 41, the first link 65 is located away from the engaging plate 63. In this state, the first link 65 is in the initial position, and the first engaging piece 65B and the second engaging piece 66A are in contact with each other, whereby the second link 66 takes the non-operating position. When the seat cushion 5L and the upper rail 42 move frontward from this state relative to the lower rail 41, the abutting piece 65A of the first link 65 strikes a trailing edge of the engaging plate 63, whereby the first link 65 rotates in the counterclockwise direction against the urging force of the first spring 65C to thereby move onto the upper face of the engaging plate 63. As a result, the first engaging piece 65B and the second engaging piece 66A are disengaged from each other so that the second link 66 is rotated in the counterclockwise direction by the urging force generated by the second spring 66D, and an end of the locking piece 66B slidingly contacts the upper face of the engaging plate 63. Then, when the seat cushion 5L and the upper rail 42 further move frontward with respect to the lower rail 41 and reach the front end position, the locking piece 66 B enters the engaging notch 63A of the engaging plate 63 as shown in FIG. 7B, whereby the seat cushion 5L is secured to its front end position with respect to the lower rail 41. As the second link 66 is rotated from the non-operating position to the operating position, the fourth control cable 71 is pulled toward the second link 66 side.

Operating the rail lock operating lever 43A allows the locking piece 66B and the engaging notch 63A to be disengaged with each other. When the rail lock operating lever 43A is operated, the fifth control cable 72 is moved to cause the second link 66 to be rotated in the clockwise direction against the urging force generated by the second spring 66D so that the locking piece 66B is pulled out from the engaging notch 63A. When the seat cushion 5L moves rearward with respect to the lower rail 41 and the abutting piece 65A moves away from the engaging plate 63, the first link 65 returns to the initial position by the first spring 65C and the second link 66 is held in the non-operating position.

The connecting mechanism 54 is provided between the unlatch lever 55 and the third control cable 53 and is configured to switch power transmission connection and disconnection between the unlatch lever 55 and the third control cable 53. Specifically, the connecting mechanism 54 does not transmit an operating force applied to the unlatch lever 55 when the connecting mechanism is not pulled by the fourth control cable 71 and is in its disconnection state, and transmits an operating force applied to the unlatch lever 55 to the third control cable 53 when the connecting mechanism is pulled by the fourth control cable 71 and is in its connection state.

Various known mechanisms can be used as the connecting mechanism 54. For example, as shown in FIG. 8, the connecting mechanism 54 preferably includes a base plate 81 on which the unlatch lever 55 is rotatably supported, an output lever 82 rotatably supported on the base plate 81 so as to be rotatable coaxially with the unlatch lever 55, and a switch lever 83 rotatably supported on the base plate 81 so as to be rotatable about a rotation axis which is not coaxial with that of the unlatch lever 55. Preferably, the base plate 81 is supported on the lower face of the cushion pan frame 18. The third control cable 53 is coupled to the output lever 82, and the fourth control cable 71 is coupled to the switch lever 83. A coupling plate 84 is coupled to the switch lever 83, and a coupling pin 85 is provided to protrude from the coupling plate 84. The unlatch lever 55 defines a first slot 87 through which the coupling pin 85 passes, and the output lever 82 defines a second slot 88 through which the coupling pin 85 passes. The first slot 87 includes a first portion 87A extending in a circumferential direction around the rotation axis of the switch lever 83 and a second portion 87B extending from one end of the first portion 87A in the circumferential direction around the rotation axis of the unlatch lever 55. The second slot 88 is defined as a slot having the same shape as and opposed to the first portion 87A of the first slot 87. The unlatch lever 55 and the switch lever 83 are urged by springs 91, 92 in their initial positions, respectively.

As shown in FIG. 8A, when the switch lever 83 is not pulled by the fourth control cable 71, the switch lever 83 is in the initial position and the coupling pin 85 is located at an end position of the first portion 87A where the second portion 87B is adjacent thereto. This state is referred to as a disconnected state. In the disconnected state, since the coupling pin 85 is in the second portion 87B of the first slot 87, the rotation of the unlatch lever 55 does not cause the coupling pin 85 to be pressed by the unlatch lever 55 so that the coupling pin 85 remains in its initial position. This means that the output lever 82 also remains at its initial position in the same manner as the coupling pin 85. Referring to FIG. 8B, when the switch lever 83 is pulled by the fourth control cable 71, the switch lever 83 is in its post-operating state in which the coupling pin 85 is located at the other end of the first portion 87A opposite to the second portion 87B side. This state is referred to as a connected state. In the connected state, when the unlatch lever 55 rotates, the coupling pin 85 is pushed by the unlatch lever 55 to rotate together with the unlatch lever 55. In this state, the output lever 82 is pushed by the coupling pin 85 to rotate together with the unlatch lever 55, pulls the third control cable 53, and unlock the latch 51C of the coupling device 51.

Preferably, an engaging groove 55A is formed at an end of the unlatch lever 55, and a strap 101 is hooked by the engaging groove 55A. As shown in FIGS. 9A and 9B, the strap 101 includes a core material 102 and a band-like member 103 wrapping around the core material 102. The band-like member 103 is formed by laminating multiple pieces of woven fabric each other or by folding and laminating one piece of woven fabric, and the band-like member 103 has an elongated shape. The core material 102 is formed of a flexible resin such as elastomer or silicone resin. The core material 102 is a plate piece extending along the band-like member 103, and has a thick part 102A which is located in an end in the longitudinal direction and thicker than the other part. The thick part 102A may be formed in a columnar shape, for example. The core material 102 and the band-like member 103 are stitched together by sewing. The thick part 102 A is included in the strap 101 so that the strap 101 has an engaging part 101A which is thicker than the other part in the longitudinal direction. The strap 101 is provided with annular parts 101B formed by the band-like member 103 at both proximal and distal ends in the longitudinal direction.

In the rear portion of the seat cushion 5L, a cover member 105 is provided for covering a rear part of the rear member 16. The cover member 105 defines a slit-like insertion hole 105A extending through the thickness of the cover member. The insertion hole 105A has a size that allows the strap 101 to pass through except for the engaging part 101A thereof. Edges of the insertion hole 105A have a large wall thickness to be more rigid. The strap 101 is arranged to pass through the insertion hole 105A, and the proximal annular part 101B is hooked on the engaging groove 55A of the unlatch lever 55. The engaging part 101A of the strap 101 is disposed outward (rearward) of the insertion hole 105A. This prevents the engaging part 101A of the strap 101 and the distal end thereof from being drawn inward of the insertion hole 105A. Since the distal end of the strap 101 protrudes outwardly from the insertion hole 105 A to form a substantially straight line shape, a user can easily grasp the strap 101.

The operation of the so configured left seat 1 will be described. When a user operates the reclining operating lever, the first control cable is pulled to unlock the reclining mechanism(s) 26. As a result, the seat back 6L is allowed to rotate frontward with respect to the seat cushion 5L.

When the seat back 6L is folded toward the seat cushion 5L at angles within a prescribed angular range, the second control cable 45 is pulled to operate the rail lock operating lever 43A. As a result, the rail locking device 43 is unlocked for a certain period of time to thereby enable the seat cushion 5L to move to its front end position by the urging force generated by the urging member 56. When the seat back 6L is completely folded toward the seat cushion 5L, the tension applied to the second control cable 45 is reduced to bring the rail locking device 43 in the locking state.

When the seat cushion 5L moves to the front end position, the second link 66 of the slide position detecting device 62 rotates, whereby the fourth control cable 71 is pulled. This brings the connecting mechanism 54 in its connecting state, under which, when the unlatch lever 55 is operated by the user via the strap 101, the operating force is applied to the latch 51C via the connecting mechanism 54 and the third control cable 53, thereby decoupling the coupling device 51 from the striker 52. When the coupling device 51 is decoupled from the striker 52, the extension of the urging device causes the seat cushion 5L to rotate frontward about the support shaft 32 to thereby take a prescribed upright position. The user can press the seat cushion 5L in the upright position to further rotate frontward to thereby take a tumbled stowed position.

When the seat back 6L is folded onto the seat cushion 5L and the seat cushion 5L is located at its front end position, the user can manually operate the rail lock operating lever 43A to cause the seat cushion 5L to move with regard to the lower rail 41. The folded seat cushion 5L and the seat back 6L may move to the rear end position with respect to the lower rail 41 such that the rear face of the seat back 6L cooperates with a seat in the back row behind the left seat 1 or with the floor 3 to form a floor surface of a luggage room or space.

In the left seat 1 configured as described above, the support shafts 32 and the coupling devices 51, which are secured to the floor 3, are disposed both frontward and rearward of the urging device 60 which generates an urging force in the front-rear direction. Thus, this configuration restricts the expansion of the urging device 60, thereby suppressing the deformation of the lower rail 41 and the seat cushion 5L to which the urging device 60 is coupled. As a result, the upper rail 42 is allowed to smoothly move relative to the lower rail 41.

Since the rear end of the urging device 60 and the coupling device 51 are coupled to the reinforcing member 48, the urging force generated by the urging device 60 is transmitted to the coupling device 51 via the reinforcing member 48 and is hardly transmitted to the lower rail 41, resulting in that the deformation of the lower rail 41 is suppressed.

In the present embodiment, since the coupling device 51 is provided on the side of the lower rail 41 such that, when viewed from the right-left direction, the coupling device 51 partially overlaps the lower rail 41 and the length of a part of the coupling device 51 which protrudes downward beyond the lower rail 41 is small compared to cases where the coupling device 51 is disposed below the lower rail 41. This means that the distance between the lower rail 41 and the floor 3 is smaller, thereby resulting in a smaller dead space created between the seat cushion 5L and the floor 3.

The urging device 60 is arranged on the right side of the left lower rail 41; that is, on a center portion of the left seat 1 in the right-left direction. Thus, this configuration reduces a difference between the loads applied on the right and left halves of the seat cushion 5L, thereby suppressing the deformation of the seat cushion 5L. Since the support shaft 32, the coupling device 51, and the urging device 60 are disposed within an inner region of the vehicle seat, the support shaft 32, the coupling device 51, and the urging device 60 are hardly visible from the outside and a user is prevented from unintentionally touching the urging device 60 or other elements under the vehicle seat.

When the seat back 6L of the seat 1 is folded onto the seat cushion 5L, the rail locking device 43 is unlocked, thereby causing the seat cushion 5 to move to the front end position with respect to the lower rail 41 by the urging force generated by the urging member. Since, when the seat back 6L is folded onto the seat cushion 5L, the seat cushion 5L is thus automatically moved to the front end position with respect to the lower rail 41, the stowing operation is easy for users. Furthermore, since the slide position detecting device 62 and the connecting mechanism 54 allow the coupling device 51 to be unlocked only when the seat cushion 5L is at the front end position with respect to the lower rail 41, an unintentional, unnecessary unlocking operation is prevented from occurring.

[Right Seat]

The right seat 2 generally has a right-left reversal structure of the left seat 1. Features of the right seat 2 which are different from the left seat 1 will be described below. As shown in FIG. 1, the seat cushion frame 7R of the right seat 2 includes a pair of right and left cushion side frames 120 extending in the front-to-rear direction, a front member 121 crossing and connecting respective front end portions of the cushion side frames 120, a rear member 122 crossing and connecting respective rear end portions of the cushion side frames 120, a first intermediate member 123 crossing and connecting respective intermediate portions between the respective front and rear end portions of the cushion side frames 120, an intermediate frame 125 extending in the front-rear direction and having a front end coupled to an intermediate portion in the right-left direction of the first intermediate member 123 and a rear end coupled to an intermediate portion in the right-left direction of the rear member 122, a second intermediate member 126 extending in the right-left direction and coupled to the intermediate frame 125 and the left cushion side frame 120, and a plate-shaped cushion pan frame 127 crossing and hanging between respective intermediate portions of the first intermediate member 123 and the rear member 122, where the intermediate portions of the first intermediate member 123 and the rear member 122 are located between the right cushion side frame 120 and the intermediate frame 125. The front member 121, the front end portion of the left cushion side frame 120, and the second intermediate member 126 are formed of curved continuous metal pipes.

Figure 10:
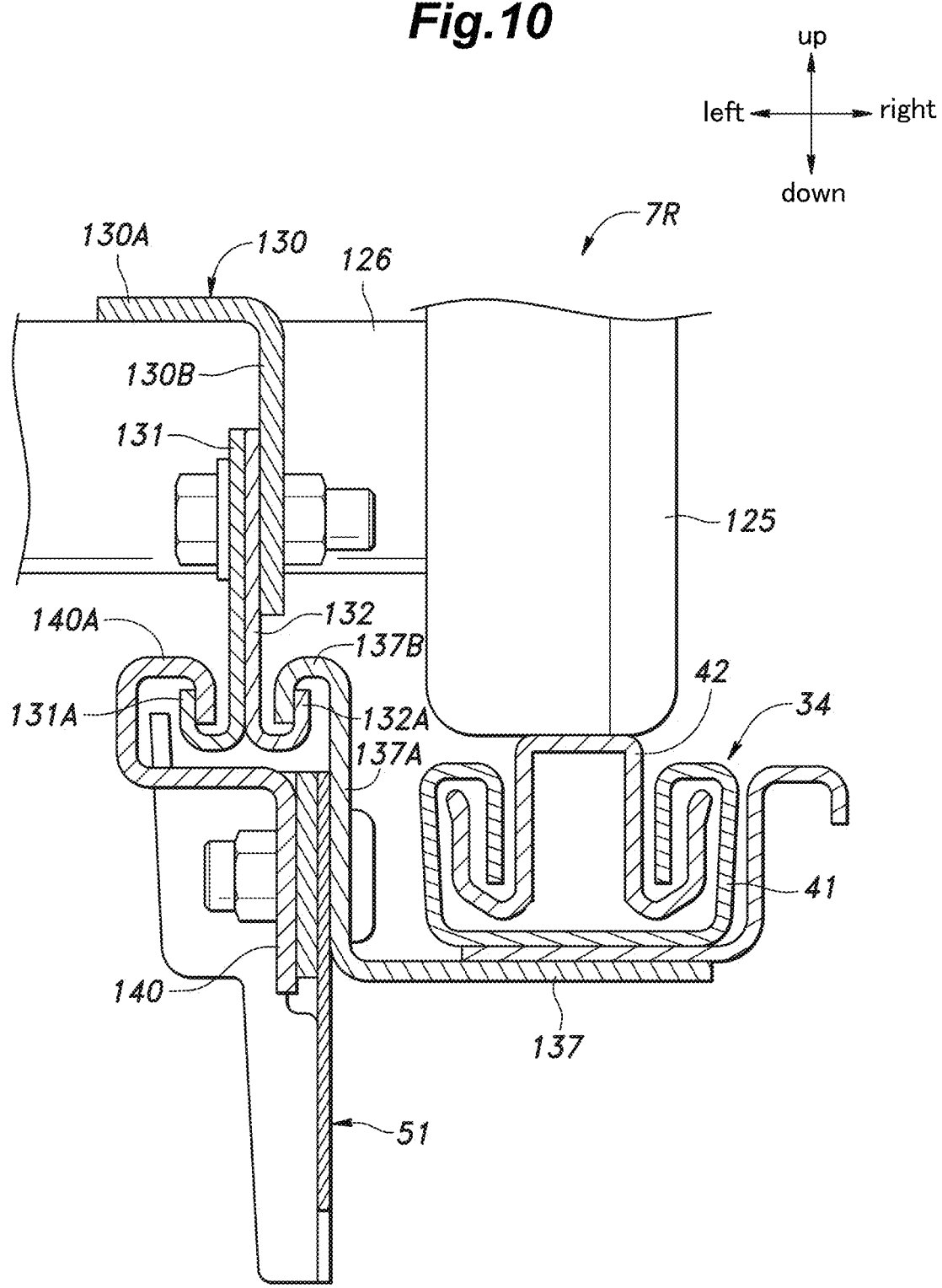
FIG. 10 is a cross-sectional view showing a critical part of the lower left side of the right seat.

As shown in FIGS. 1 and 10, the right seat also includes a bracket 130 crossing and hanging between the second intermediate member 126 and the rear member 122. The bracket 130 includes an upper wall part 130A supported on and welded to upper faces of the second and intermediate members 126 and 122, and a vertical wall 130B extending downward from the upper wall part 130A and having right and left main faces. A left supporting plate 131 and a right supporting plate 132 are coupled to the vertical wall 130B by bolt fastening or other fastening methods. The left supporting plate 131 and the right supporting plate 132 are arranged along the vertical wall 130B with their main faces facing to the right and left, respectively. Formed at a lower end portion of the left supporting plate 131 is a left hook part 131A which is curved leftward and upward. Formed at a lower end portion of the right supporting plate 132 is a right hook part 132A which is curved rightward and upward.

The right cushion side frame 120 and the intermediate frame 125 of the right seat 2 are coupled to the respective upper rails 42 of the right and left slide rails 34. The slide rail 34 is the same slide rail as that of the left seat 1. Each slide rail 34 is rotatably provided on the floor 3 by a support member 136 coupled to the floor 3 and a rotating member 137 rotatably supported at a front end of the support member 136. The rotating member 137 on the left side is comprised of multiple steel-metal members, and forms a groove portion extending in the front-rear direction. The lower rail 41 on the left side is arranged within the groove portion of the left rotating member 137. Formed at an upper end portion of the left side wall 137A of the left rotating member 137 is a hook part 137B extending in the front-rear direction. The hook part 137B of the rotating member 137 is hooked on the right hook part 132A of the right supporting plate 132.

The same coupling device 51 as that of the left seat 1 is coupled to the left side wall 137A of the left rotating member 137. A reinforcing bracket 140 is coupled to the cover plate 51B which defines the left side face of the coupling device 51. Formed at an upper end portion of the reinforcing bracket 140 is a hook part 140A, which is hooked on the left hook portion 131A of the left supporting plate 131. Preferably, the reinforcing bracket 140 is tightened together with the coupling device 51 to the left rotating member 137.

Although the present invention has been described based on a specific embodiment, the embodiment is not intended to limit the scope of the present invention. Many modifications and variations of the invention are possible in light of the above teachings, and thus, the invention may be practiced other than as specifically described within the scope of the appended claims.

Glossary

1 left seat
3 floor
5L seat cushion
7L seat cushion frame
8L seat back frame
26 reclining mechanism
31 support member
32 support shaft
33L rotating member
34 slide rail
37 first member
38 second member
39 third member
41 lower rail
42 upper rail
43 rail locking device
45 second control cable (power transmission member)
48 reinforcing member
51 coupling device
51C latch
52 striker
54 connecting mechanism
55 unlatch lever
60 urging device
60A cylinder
60B rod
62 slide position detecting device
63 engaging plate
63A engaging notch
65 first link
66 second link
101 strap

The invention claimed is:

1. A vehicle seat including a seat cushion, wherein the vehicle seat is capable of taking a usable position and a stowed position in which the seat cushion is rotatably lifted away from a floor, the vehicle seat comprising:
   a support member coupled to the floor;
   a rotating member rotatably supported by the support member via a support shaft extending in a right-left direction;
   a lower rail extending in a front-rear direction and coupled to the rotating member;
   an upper rail slidably supported by the lower rail and coupled to the seat cushion;
   a coupling device provided at a rear end of the lower rail and capable of selectably connecting to a striker provided on the floor; and
   an urging device extending the front-rear direction and having a front end coupled to the support member and a rear end coupled to the lower rail,
   wherein the urging device is configured to be expandable and contractible in a longitudinal direction thereof so as to urge the seat cushion in such a direction as to rotate about the support shaft away from the floor, and
   wherein the front end of the urging device is arranged lower than an upper end of the striker.

2. The vehicle seat according to claim 1, wherein when the vehicle seat is in the usable position, the rear end of the urging device is arranged at substantially the same height as the upper end of the striker.

3. The vehicle seat according to claim 1, wherein the urging device is arranged leftward of a right end of the support member and rightward of a left end of the support member.

4. The vehicle seat according to claim 1, wherein the front end of the urging device is arranged rearward of the support shaft and forward of a front end of the lower rail.

5. The vehicle seat according to claim 1, wherein in a left-right direction, the urging device is arranged on a center side of the seat cushion rather than the coupling device.

6. The vehicle seat according to claim 1, wherein a rear end of the lower rail is arranged rearward of the striker.

7. The vehicle seat according to claim 1, wherein viewed from the front, the support member has a portion overlapping the lower rail.

8. The vehicle seat according to claim 1, wherein the rear end of the urging device is coupled to the lower rail via a reinforcing member coupled to the lower rail, and
viewed from the front, the support member has a portion overlapping the reinforcing member.

9. The vehicle seat according to claim 8, wherein the reinforcing member has a bend portion protruding away from the lower rail, and
the bend portion is arranged between the rear end of the urging device and the striker.

10. The vehicle seat according to claim 8, wherein a rear end of the reinforcing member is arranged at substantially the same position as the striker in the front-rear direction.

11. A method of making a vehicle seat including a seat cushion, the vehicle seat being capable of taking a usable position and a stowed position in which the seat cushion is rotatably lifted away from a floor, the method comprising:
coupling a support member to the floor;
supporting a rotating member rotatably to the support member via a support shaft extending in a right-left direction;
coupling a lower rail to the rotating member, the lower rail being extending in a front-rear direction;
coupling the seat cushion to an upper rail supported slidably to the lower rail;
coupling a coupling device to a rear end of the lower rail, the coupling device being capable of selectably connecting to a striker provided on the floor; and
coupling an urging device extending the front-rear direction to the support member at a front end and the lower rail at a rear end,
wherein the urging device is configured to be expandable and contractible in a longitudinal direction thereof so as to urge the seat cushion in such a direction as to rotate about the support shaft away from the floor, and
the front end of the urging device is arranged lower than an upper end of the striker.

12. The method according to claim 11, wherein when the vehicle seat is in the usable position, the rear end of the urging device is arranged at substantially the same height as the upper end of the striker.

13. The method according to claim 11, wherein the urging device is arranged leftward of a right end of the support member and rightward of a left end of the support member.

14. The method according to claim 11, wherein the front end of the urging device is arranged rearward of the support shaft and forward of a front end of the lower rail.

15. The method according to claim 11, wherein in a left-right direction, the urging device is arranged on a center side of the seat cushion rather than the coupling device.

16. The method according to claim 11, wherein a rear end of the lower rail is arranged rearward of the striker.

17. The method according to claim 11, wherein viewed from the front, the support member has a portion overlapping the lower rail.

18. The method according to claim 10, wherein the rear end of the urging device is coupled to the lower rail via a reinforcing member coupled to the lower rail, and
viewed from the front, the support member has a portion overlapping the reinforcing member.

19. The method according to claim 18, wherein the reinforcing member has a bend portion protruding away from the lower rail, and
the bend portion is arranged between the rear end of the urging device and the striker.

20. The method according to claim 18, wherein a rear end of the reinforcing member is arranged at substantially the same position as the striker in the front-rear direction.

* * * * *